2,796,849
ANTI-KICKING DEVICE FOR COWS

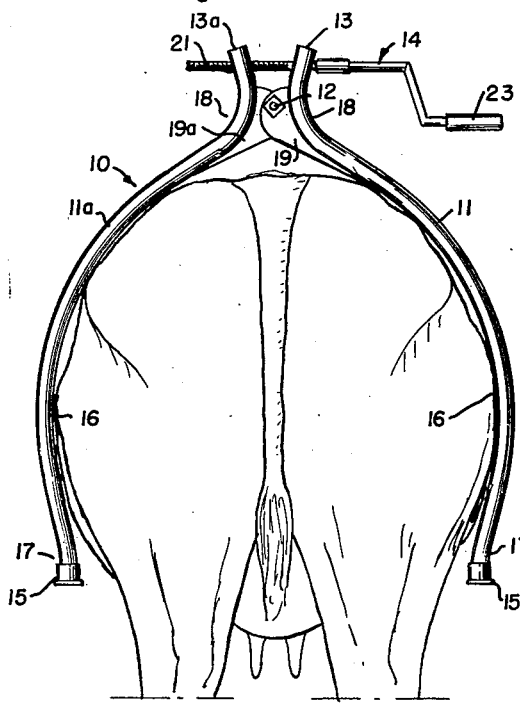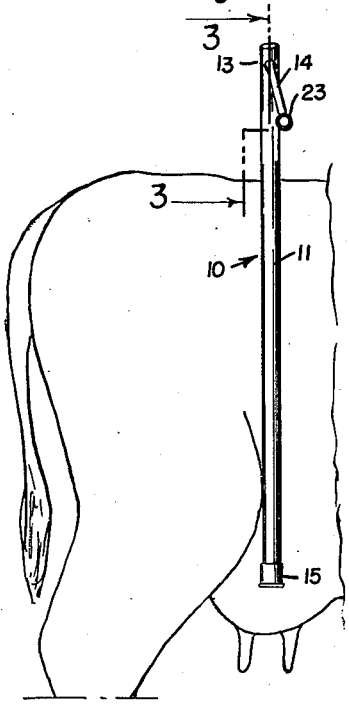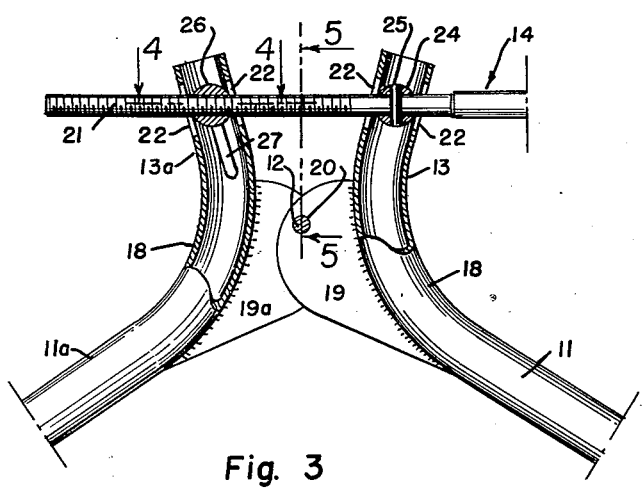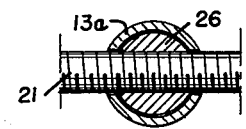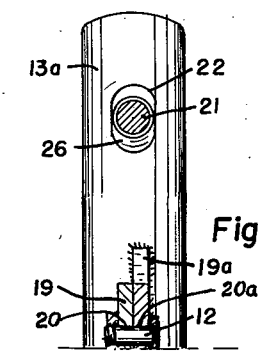

Melvin C. Anderson and Sidney F. Hanks, Strasburg, Colo.

Application September 27, 1954, Serial No. 458,623

14 Claims. (Cl. 119—126)

This invention relates to devices and apparatus for restraining the movements of animals, and more particularly to that class of apparatus and devices, generally in the form of body clamps, which are used primarily to restrain cows and prevent them from kicking while being milked or while their udders are being cared for, or like purposes. It follows that a primary object of the invention is to provide a novel and improved anti-kick body clamp for milk cows.

Other objects of the invention are to provide such a novel and improved anti-kick body clamp for milk cows which: (a) is quickly and easily mounted upon and engaged about a cow; (b) is adjustable to properly fit cows of various sizes and body forms; (c) is adapted to fit upon a cow with any selected degree of tightness; (d) is adapted to be adjustably tightened or released when in position upon a cow and is thereby especially useful in training a cow and breaking her from kicking habits; (e) is quickly and easily disengaged and removed from a cow; and (f) is an exceedingly simple, lightweight, low-cost unit which is also strong, rugged and durable.

With the foregoing and other objects in view, all of which more fully hereinafter appear, this invention comprises certain novel and improved constructions, combinations and arrangements of parts and elements, as hereinafter described and as defined in the appended claims, and illustrated in preferred embodiment in the accompanying drawing, in which:

Figure 1 is a rear elevation view of a milk cow with my improved anti-kick body clamp mounted in position across her back preparatory to tightening the clamp to restrain the movements of the animal.

Figure 2 is a side elevation view of the rear quarters of the cow and the clamp.

Figure 3 is an enlarged, fragmentary portion of the clamp per se, being partly in section to show constructions otherwise hidden from view, as taken substantially on the indicated line 3—3 at Fig. 2.

Figure 4 is a fragmentary sectional detail as taken from the indicated line 4—4 at Fig. 3 but on a further enlarged scale.

Figure 5 is a fragmentary sectional portion as taken substantially from the indicated line 5—5 at Fig. 3 but on a further enlarged scale.

Various devices have been developed to restrain milk cows from kicking and other movement when they are being milked or when it is necessary to treat their udders, and one class of such devices takes the form of a body clamp which is fastened about the waist of the animal to press in against the animal's ribs and into her body cavity whenever she starts to lift a leg to kick. Such clamps are generally effective and yet will not injure the animal.

There is a definite need, however, for an improved clamp for restraining milk cows, to provide a neat lightweight unit which combines adjustable features so that a single clamp will fit cows of various sizes and body builds, and a unit which may be easily tightened or loosened during a milking operation to provide for the gradual breaking of a milk cow from undesirable kicking habits.

With such, and other objects in view, the present invention was conceived and developed, and comprises, in essence, a body clamp which is adapted to be mounted upon a cow with the arms of the clamp embracing the animal's waist and means for adjustably tightening the clamp whereby the arms press into the animal's flanks with any selected pressure, all as hereinafter described in detail.

Referring more particularly to the drawing, this improved body clamp 10 includes a pair of arched gripping arms 11 and 11a which lie in a common plane and are in symmetrical opposition with each other. Each arm 11 and 11a is generally arched and curved to conform with a side of a cow as more fully hereinafter described. These arms come together near one end, hereinafter referred to as the top, and are joined at the top by an interconnecting pivot 12. Beyond and above this point, the arms upstand and diverge outwardly as prongs 13 and 13a which carry the shaft of an adjusting crank 14, all as more fully hereinafter described.

Each arm 11 and 11a is preferably formed as a tubular element to attain the maximum strength and rigidity for the minimum weight. The bottom end is covered by a protective cap 15 of rubber or similar soft material. The arch of each arm is on a curve having the general shape of a side of a cow, with a greater curvature 16 near the bottom to conform with the bulging belly portion of the flank below the narrower back while the bottom end forms a slight ogee or reverse 17 to prevent the end from injuriously pressing into the flank.

The top portion of each arm 11 and 11a forms an ogee 18, turning outwardly to define the upstanding prongs 13 and 13a. A plate 19 is connected to the arm 11 at the ogee 18 to extend inwardly and overlap a mating plate 19a on the other arm 11a, with an orifice 20 through plate 19 in registration with an orifice 20a in the plate 19a. The pivot 12 extends through these orifices 20 and 20a, and it may be an ordinary machine bolt and nut.

These plates 19 and 19a, extending inwardly from each arm to the center of the clamp, space the upper sections of the arms 11 and 11a apart, and the arms slope downwardly from the plates to rest upon the muscles at each side of, but not upon, the spinal column of a cow. As the arms are squeezed together there is some movement in the upper section of the arms to squeeze the back muscles but considerably more movement at the lower ends to squeeze in the flank muscles at the belly. This is in natural conformity with the anatomy of the cow because the flank muscles are far more yieldable. Moreover, such construction forms a natural adjustment for different sized cows as will become obvious in the use of the clamp.

The adjusting crank 14 includes a shaft 21 which extends transversely across and through each prong 13 and 13a, through diametrically opposing orifices 22 in each tubular prong. These orifices are axially elongated to an oval shape to permit the shaft 21 to extend through each prong at various inclinations to the normal of the prong axis as the prongs incline with respect to each other and to the shaft as the clamp is being opened and closed. This crank 14 is rotatable about the shaft 21 axis as by handle 23 and is affixed in position in the prong 13, passing through a spherical sleeve 24 within the tube and being secured thereto as by a pin 25. The sleeve 24 is substantially the same diameter as the interior of the tubular prong 13, whereby it will rotate within the prong regardless of the inclination of the shaft 21, yet not permit the shaft to shift from its position in the prong.

The portion of the shaft which extends through prong 13a is threaded and extends through an interiorly-threaded spherical sleeve 26 which is substantially the same diameter as the interior of the tubular prong 13a. This sleeve 26 includes a finger 27 which is adapted to bear against the interior wall of the tube and provide a stop to prevent rotation of the sleeve with rotation of the shaft 21, whereby rotation of shaft 21 in the sleeve 26 moves the shaft therethrough to pull the prongs 13 and 13a together or push them apart.

It follows that the operation of the apparatus consists in placing the clamp 10 over the back of a cow, and then rotating the crank handle 23 to move the prongs 13 and 13a apart and the legs 11 and 11a together to press against the flanks of the animal. When the cow is being milked, the pressure may be gradually released by turns of the crank, and as the cow becomes quiet and docile all pressure may be released. Conversely, if the animal becomes nervous pressure may be increased to whatever degree is necessary.

While we have illustrated and described many details of construction, it is obvious that alternatives and equivalents will occur to those skilled in the art; hence, it is our desire that our protection be limited, not by the details herein illustrated and described, but only by the proper scope of the appended claims.

We claim:

1. A body clamp for a cow adapted to extend over the back and waist of a cow, including, in combination, a pair of opposing tubular arms arched to conform with the sides of a cow and extend over the back of the animal and thence curved on an ogee to extend upwardly as opposing prongs, a plate at each ogee curve extending towards and lapping the opposing plate, a pivot in the plates at the lap, and adjustable, self-locking means at the end of the prongs adapted to forcibly move the prongs together or apart with the spacing between the prongs being lockable at all positions whereby to rotate the arms about the pivot with the same being locked at any selected position.

2. The clamp defined in claim 1, wherein said means include a rotatable shaft connected with both prongs near their ends and having a lead screw thereon, a threaded sleeve upon said lead screw secured to a prong in a non-rotatable position along the lead screw axis but in a partially rotatable position along an axis substantially perpendicular thereto.

3. The clamp defined in claim 1, wherein said means include a rotatable shaft extending through the prongs near their ends and having a lead screw thereon, a spherical threaded sleeve upon said lead screw and within a prong, and a finger on said sleeve adapted to prevent rotation of the sleeve about the lead screw axis but to permit partial rotation of the sleeve within the prong about an axis substantially perpendicular thereto.

4. The clamp defined in claim 3, including a second spherical sleeve upon the shaft and within the second prong, and means for securing said second sleeve in a non-shiftable position upon the shaft, but permitting its rotation in the prong.

5. The clamp defined in claim 3, wherein said prongs include oval orifices through the tube walls to receive said shaft.

6. A body clamp for a cow adapted to extend over the waist of a cow and comprising a pair of opposed gripping arms arched to conform with the body of the cow, a pivot interconnecting the arms near one end thereof and means interconnecting the arms near the pivot forcibly moving the arms together, said means including an internally threaded sleeve at one arm, a threaded lead screw extending through the other arm and into the sleeve, means associated with said sleeve preventing rotation of the sleeve about the lead screw axis but permitting partial rotation of the sleeve on said arm about an axis perpendicular to the plane of the lead screw and arm and abutment means at said other arm permitting rotation of the lead screw therein but holding the lead screw against movement through said other arm when the arms are being clamped upon a cow by rotation of the lead screw.

7. The apparatus defined in claim 6, wherein said abutment means is partially rotatable on said other arm, about an axis perpendicular to the plane of the lead screw and the arms.

8. A body clamp for a cow adapted to extend over the waist of a cow, including, in combination, a pair of opposed gripping arms arched to conform with the body of a cow, a pivot interconnecting the arms near one end, a prong extending from each arm beyond the pivot, and means forcibly moving the ends of the prongs together and apart to open and close the arms, said means including, a rotatable shaft having a lead screw thereon extending through the prongs, a threaded sleeve upon said lead screw and within one prong, means at the other prong holding the shaft against axial movement therethrough but permitting shaft rotation therein, and means associated with the sleeve about the lead screw axis but permitting partial rotation of the sleeve within the prong about an axis substantially perpendicular thereto.

9. The body clamp defined in claim 8, wherein said sleeve is spherical in form and said sleeve associated means is a finger on the sleeve extending into the prong.

10. The body clamp defined in claim 8, wherein said sleeve is spherical in form.

11. The body clamp defined in claim 8, wherein said sleeve associated means is a finger on the sleeve extending into the prong.

12. A body clamp for a cow adapted to extend over the waist of a cow, including, in combination, a pair of opposed gripping arms arched to conform with the body of a cow, a pivot interconnecting the arms near one end thereof and means interconnecting the arms near the pivot forcibly moving the arms together, said means including a rotatable shaft having a lead screw thereon, a threaded sleeve upon the lead screw, means at one arm holding the shaft and permitting rotation of the shaft about the lead screw axis, and means at the other arm holding the sleeve and preventing rotation of the sleeve about the lead screw axis but permitting partial rotation thereof about an axis perpendicular thereto.

13. A body clamp for a cow adapted to extend over the waist of a cow, including, in combination, a pair of opposed gripping arms arched to conform with the body of a cow, a pivot interconnecting the arms near one end thereof and means interconnecting the arms near the pivot to forcibly move the arms together, said means including a shaft having a lead screw thereon, a threaded sleeve upon the lead screw, means at one arm holding the shaft and means at the other arm holding the sleeve, said means further permitting rotation of one element about the lead screw axis and preventing rotation of the other element about the lead screw axis but permitting partial rotation of said other element about an axis substantially perpendicular thereto.

14. A body clamp for a cow adapted to extend over the waist of a cow, including, in combination, a pair of opposed gripping arms arched to conform with the body of a cow, a pivot interconnecting the arms near one end thereof and means interconnecting the arms near the pivot to forcibly move the arms together, said means including a pair of sleeves, means at each arm to hold a sleeve, a shaft having a lead screw thereon extending through one sleeve and into the other sleeve, one sleeve being internally threaded and threaded upon the shaft lead screw, the second sleeve including abutment means associated with the shaft to prevent movement of the shaft through the sleeve, the sleeve holding means holding the first said sleeve preventing rotation of the sleeve about the lead screw axis but permitting partial rotation of the sleeve about an axis perpendicular thereto.

References Cited in the file of this patent

UNITED STATES PATENTS

| 1,012,165 | Schimke | Dec. 19, 1911 |
| 2,655,900 | Basler et al. | Oct. 20, 1953 |
| 2,743,701 | Boyd | May 1, 1956 |